(12) United States Patent
Wang et al.

(10) Patent No.: US 12,531,510 B2
(45) Date of Patent: Jan. 20, 2026

(54) LOCATION UPDATE METHOD AND APPARATUS OF PHOTOVOLTAIC STRING

(71) Applicant: Huawei Digital Power Technologies Co., Ltd., Shenzhen (CN)

(72) Inventors: Jianqiang Wang, Shanghai (CN); Yuandong Meng, Shanghai (CN); Song Wan, Shanghai (CN); Yanzhong Zhang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 541 days.

(21) Appl. No.: 17/868,105

(22) Filed: Jul. 19, 2022

(65) Prior Publication Data

US 2022/0352849 A1   Nov. 3, 2022

Related U.S. Application Data

(63) Continuation of application No. PCT/CN2020/113622, filed on Sep. 4, 2020.

(30) Foreign Application Priority Data

Jan. 22, 2020   (CN) .......................... 202010075397.6

(51) Int. Cl.
*H02S 50/15*      (2014.01)
*G06T 7/00*      (2017.01)
*H02J 3/00*      (2006.01)

(52) U.S. Cl.
CPC ............ *H02S 50/15* (2014.12); *G06T 7/0002* (2013.01); *H02J 3/004* (2020.01); *H02J 2300/24* (2020.01)

(58) Field of Classification Search
CPC ....... H02S 50/15; H02J 3/004; H02J 2300/24; G06T 7/0002
See application file for complete search history.

(56) References Cited

U.S. PATENT DOCUMENTS 9,588,058 B1    3/2017   Bora et al.
2014/0293669 A1*  10/2014  Fornage ............... H02J 3/381
                                                      363/95

(Continued)

FOREIGN PATENT DOCUMENTS

CN    104796082 A        7/2015
CN    104899936 A   *    9/2015

(Continued)

*Primary Examiner* — Catherine T. Rastovski
*Assistant Examiner* — Sharad Timilsina
(74) *Attorney, Agent, or Firm* — Maier & Maier, PLLC

(57) ABSTRACT

A photovoltaic string location update method and apparatus includes: obtaining, based on a physical map, a physical location of a first photovoltaic string corresponding to a first logical location in the physical map, the physical map indicating a correspondence between a logical location of a photovoltaic string and a physical location of the photovoltaic string, and the photovoltaic string includes the first photovoltaic string; and when the physical location of the first photovoltaic string in the physical map is different from a first actual physical location of the first photovoltaic string, updating the physical location of the photovoltaic string in the physical map to the first actual physical location, to obtain an updated physical map. The first actual physical location of the photovoltaic string is inconsistent with the physical location in the physical map, to prepare for subsequent operation and maintenance accurately performed on the photovoltaic string.

19 Claims, 8 Drawing Sheets

(56) References Cited

U.S. PATENT DOCUMENTS

2017/0343338 A1* 11/2017 Hamaguchi ............ G01B 11/25
2020/0099335 A1*  3/2020 Pandey .................. H02S 50/00

FOREIGN PATENT DOCUMENTS

| CN | 104917460 | A |   | 9/2015  |             |
|----|-----------|---|---|---------|-------------|
| CN | 205249118 | U | * | 5/2016  |             |
| CN | 105743439 | A |   | 7/2016  |             |
| CN | 106052700 |   | * | 10/2016 |             |
| CN | 106052700 | A |   | 10/2016 |             |
| CN | 104899936 | B | * | 6/2017  |             |
| CN | 107003116 | A |   | 8/2017  |             |
| CN | 107769250 | A |   | 3/2018  |             |
| CN | 107782764 | A |   | 3/2018  |             |
| CN | 108092622 | A |   | 5/2018  |             |
| CN | 108390645 | A | * | 8/2018  | ............ G05D 1/101 |
| CN | 108919821 |   | * | 11/2018 |             |
| CN | 108919821 | A | * | 11/2018 | ............ G05D 1/101 |
| CN | 110022123 | A |   | 7/2019  |             |
| CN | 110277961 | A |   | 9/2019  |             |
| CN | 110719038 | A |   | 1/2020  |             |
| CN | 210640852 | U |   | 5/2020  |             |
| WO | 2018211427 | A1 |  | 11/2018 |             |
| WO | 2019212981 | A1 |  | 11/2019 |             |

\* cited by examiner

LOCATION UPDATE METHOD AND APPARATUS OF PHOTOVOLTAIC STRING

CROSS-REFERENCE TO RELATED APPLICATIONS

This application is a continuation of International Application No. PCT/CN2020/113622, filed on Sep. 4, 2020, which claims priority to Chinese Patent Application No. 202010075397.6, filed on Jan. 22, 2020. The disclosures of the aforementioned applications are hereby incorporated by reference in their entireties.

TECHNICAL FIELD

The embodiments relate to photovoltaic technologies, a location update method, and an apparatus of a photovoltaic string.

BACKGROUND

With large-scale application of photovoltaic technologies, application scenarios are increasingly diversified. Currently, in a photovoltaic power station, a solar photovoltaic module is a basic unit of an optoelectronic system (or an optoelectronic apparatus) for implementing optical-to-electrical conversion and can convert sunlight energy to direct-current electrical energy. When the photovoltaic module converts the sunlight energy to the direct-current electrical energy, the following problem may occur: Output power of the photovoltaic module is low. Therefore, operation and maintenance need to be regularly performed on the photovoltaic module.

Generally, when the operation and maintenance are performed on the photovoltaic module, a photovoltaic string in which the photovoltaic module is located needs to be first determined. However, in a construction process of a power station, the following case may exist: An actual physical location of the photovoltaic string is inconsistent with a physical location in a physical map. As a result, the operation and maintenance cannot be accurately performed on the photovoltaic module subsequently.

SUMMARY

The embodiments provide a location update method and apparatus of a photovoltaic string. When the embodiments are implemented, the following case is avoided: An actual physical location of a photovoltaic string is inconsistent with a physical location in a physical map, to prepare for subsequent operation and maintenance accurately performed on a photovoltaic module.

According to a first aspect, a possible implementation provides a photovoltaic string location update method. The method may be applied to an electronic apparatus. The electronic apparatus may be, for example, a photovoltaic power station management system, a chip, or an apparatus including the chip. The method includes:
  obtaining, based on a physical map, a physical location of a first photovoltaic string corresponding to a first logical location in the physical map, where the physical map is used to indicate a correspondence between a logical location of a photovoltaic string and a physical location of the photovoltaic string in the physical map, and the photovoltaic string includes the first photovoltaic string; and
  when the physical location of the first photovoltaic string in the physical map is different from a first actual physical location of the first photovoltaic string, updating the physical location of the photovoltaic string in the physical map to the first actual physical location, to obtain an updated physical map.

The first logical location is an identifier corresponding to the first photovoltaic string. For example, the first logical location may be a number corresponding to the first photovoltaic string.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on a photovoltaic module.

In a possible implementation, the method further includes:
  receiving a first infrared image from an image collection terminal, where the first infrared image includes a plurality of photovoltaic strings, the first photovoltaic string is one of the plurality of photovoltaic strings, and an image feature corresponding to the first photovoltaic string in the first infrared image is different from an image feature corresponding to another photovoltaic string; and
  obtaining, based on the first infrared image, a physical location of a photovoltaic string whose image feature is different from the image feature corresponding to another photovoltaic string, to obtain the first actual physical location.

The actual physical location of the photovoltaic string may be obtained based on the infrared image to prepare for subsequent update of the physical map.

In a possible implementation, the physical map is further used to indicate a relative physical location relationship between the plurality of photovoltaic strings. The obtaining, based on the first infrared image, a physical location of a photovoltaic string whose image feature is different from the image feature corresponding to another photovoltaic string, to obtain the first actual physical location includes:
  obtaining the first actual physical location based on the relative physical location relationship between the plurality of photovoltaic strings and the first infrared image.

The actual physical location of the photovoltaic string may be obtained based on the infrared image to prepare for subsequent update of the physical map.

In a possible implementation, before receiving the first infrared image from the image collection terminal, the method further includes:
  sending a control indication to an inverter, where the control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the infrared image.

In a possible implementation, the method further includes:
receiving the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to a first photovoltaic module. The first photovoltaic module is one of the plurality of photovoltaic modules.

The actual physical location of the photovoltaic string may be obtained to prepare for subsequent update of the physical map.

In a possible implementation, the method further includes:
receiving a logical location of a faulty photovoltaic string from the inverter;
obtaining a physical location of the faulty photovoltaic string based on the updated physical map and the logical location of the faulty photovoltaic string; and
sending the physical location of the faulty photovoltaic string to the image collection terminal, where the physical location of the faulty photovoltaic string is used by the image collection terminal to perform photographing.

When the logical location of the faulty photovoltaic string is roughly determined, the physical location of the faulty photovoltaic string may be obtained based on the updated physical map to prepare for photographing performed by the image collection terminal based on the physical location of the faulty photovoltaic string.

In a possible implementation, the method further includes:
receiving a fault type of a faulty photovoltaic module from the image collection terminal, where the faulty photovoltaic module is at least one photovoltaic module of the faulty photovoltaic string, the fault type of the faulty photovoltaic module is obtained by the image collection terminal based on a second infrared image including the faulty photovoltaic module, and the second infrared image is obtained through photographing performed by the image collection terminal based on the physical location of the faulty photovoltaic string.

The faulty photovoltaic module may be finely determined and the fault type of the faulty photovoltaic module may be obtained to prepare for subsequent operation and maintenance.

According to a second aspect, a possible implementation provides a photovoltaic string location update method. The method may be applied to an electronic apparatus. The electronic apparatus may be, for example, a photovoltaic power station management system, a chip, or an apparatus including the chip. The method includes:
receiving a logical location of a faulty photovoltaic string that is sent from an inverter;
obtaining a physical location of the faulty photovoltaic string based on the logical location of the faulty photovoltaic string; and
sending the physical location of the faulty photovoltaic string to an image collection terminal, where the physical location of the faulty photovoltaic string is used by the image collection terminal to perform photographing.

When the logical location of the faulty photovoltaic string is roughly determined, the physical location of the faulty photovoltaic string may be obtained to prepare for photographing performed by the image collection terminal based on the physical location of the faulty photovoltaic string.

In a possible implementation, obtaining the physical location of the faulty photovoltaic string based on the logical location of the faulty photovoltaic string includes:
obtaining the physical location of the faulty photovoltaic string based on the logical location of the faulty photovoltaic string and a correspondence between a logical location of a photovoltaic string and a physical location.

When the logical location of the faulty photovoltaic string is roughly determined, the physical location of the faulty photovoltaic string may be obtained based on the correspondence between a logical location of a photovoltaic string and a physical location.

In a possible implementation, before obtaining the physical location of the faulty photovoltaic string based on the logical location of the faulty photovoltaic string and a first correspondence between a logical location of a photovoltaic string and a physical location, the method further includes:
obtaining, based on a physical map, a physical location of a first photovoltaic string corresponding to a first logical location in the physical map, where the physical map is used to indicate a correspondence between a logical location of a photovoltaic string and a physical location of the photovoltaic string in the physical map, and the photovoltaic string includes the first photovoltaic string; and
when the physical location of the first photovoltaic string in the physical map is different from a first actual physical location of the first photovoltaic string, updating the physical location of the photovoltaic string in the physical map to the first actual physical location, to obtain the updated physical map.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on the photovoltaic module. In addition, when the logical location of the faulty photovoltaic string is subsequently roughly determined, the physical location of the faulty photovoltaic string is obtained based on the correspondence between a logical location of a photovoltaic string and a physical location.

In a possible implementation, the method further includes:
receiving a first infrared image from the image collection terminal, where the first infrared image includes a plurality of photovoltaic strings, the first photovoltaic string is one of the plurality of photovoltaic strings, and an image feature corresponding to the first photovoltaic string in the first infrared image is different from an image feature corresponding to another photovoltaic string; and
obtaining, based on the first infrared image, a physical location of a photovoltaic string whose image feature is different from the image feature corresponding to another photovoltaic string, to obtain the first actual physical location.

The actual physical location of the photovoltaic string may be obtained based on the infrared image to prepare for subsequent update of the physical map based on the actual physical location of the photovoltaic string.

In a possible implementation, the physical map is further used to indicate a relative physical location relationship between the plurality of photovoltaic strings. The obtaining, based on the first infrared image, a physical location of a photovoltaic string whose image feature is different from the image feature corresponding to another photovoltaic string, to obtain the first actual physical location includes:

obtaining the first actual physical location based on the relative physical location relationship between the plurality of photovoltaic strings and the first infrared image.

The actual physical location of the photovoltaic string may be obtained based on the infrared image to prepare for subsequent update of the physical map.

In a possible implementation, before the receiving a first infrared image from the image collection terminal, the method further includes:

sending a control indication to the inverter, where the control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the physical map and the infrared image.

In a possible implementation, the method further includes:

receiving the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

The actual physical location of the photovoltaic string may be obtained to prepare for subsequent update of the physical map based on the actual physical location of the photovoltaic string.

In a possible implementation, the method further includes:

receiving a fault type of a faulty photovoltaic module from the image collection terminal, where the faulty photovoltaic module is at least one photovoltaic module of the faulty photovoltaic string, the fault type of the faulty photovoltaic module is obtained by the image collection terminal based on a second infrared image including the faulty photovoltaic module, and the second infrared image is obtained through photographing performed by the image collection terminal based on the physical location of the faulty photovoltaic string.

The faulty photovoltaic module may be finely determined and the fault type of the faulty photovoltaic module may be obtained to prepare for subsequent operation and maintenance.

According to a third aspect, a possible implementation provides a photovoltaic string location update apparatus, including:

a processing module, configured to obtain, based on a physical map, a physical location of a first photovoltaic string corresponding to a first logical location in the physical map, where the physical map is used to indicate a correspondence between a logical location of a photovoltaic string and a physical location of the photovoltaic string in the physical map, and the photovoltaic string includes the first photovoltaic string.

The processing module is further configured to: when the physical location of the first photovoltaic string in the physical map is different from a first actual physical location of the first photovoltaic string, update the physical location of the photovoltaic string in the physical map to the first actual physical location, to obtain the updated physical map.

In a possible implementation, the apparatus further includes a transceiver module.

The transceiver module is configured to receive a first infrared image from an image collection terminal. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string.

The processing module is further configured to obtain, based on the first infrared image, a physical location of a photovoltaic string whose image feature is different from the image feature corresponding to another photovoltaic string, to obtain the first actual physical location.

In a possible implementation, the physical map is further used to indicate a relative physical location relationship between the plurality of photovoltaic strings.

The processing module is configured to obtain the first actual physical location based on the relative physical location relationship between the plurality of photovoltaic strings and the first infrared image.

In a possible implementation, before receiving the first infrared image sent by the image collection terminal, the transceiver module is further configured to send a control indication to an inverter, where the control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

In a possible implementation, the apparatus further includes the transceiver module. The transceiver module is configured to receive the first actual physical location sent from the first photovoltaic string.

In a possible implementation, the transceiver module is further configured to receive a logical location of a faulty photovoltaic string that is sent by the inverter.

The processing module is further configured to obtain a physical location of the faulty photovoltaic string based on the updated physical map and the logical location of the faulty photovoltaic string.

The transceiver module is further configured to send the physical location of the faulty photovoltaic string to the image collection terminal. The physical location of the faulty photovoltaic string is used by the image collection terminal to perform photographing.

In a possible implementation, the transceiver module is further configured to receive a fault type of the faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

According to a fourth aspect, a possible implementation provides a photovoltaic string location update apparatus, including:
 a transceiver module, configured to receive a logical location of a faulty photovoltaic string that is sent from an inverter; and
 a processing module, configured to obtain a physical location of the faulty photovoltaic string based on the logical location of the faulty photovoltaic string.

The transceiver module is further configured to send the physical location of the faulty photovoltaic string to an image collection terminal. The physical location of the faulty photovoltaic string is used by the image collection terminal to perform photographing.

In a possible implementation, in the aspect of obtaining the physical location of the faulty photovoltaic string based on the logical location of the faulty photovoltaic string, the processing module is configured to obtain the physical location of the faulty photovoltaic string based on the logical location of the faulty photovoltaic string and a correspondence between a logical location of a photovoltaic string and a physical location.

In a possible implementation, before obtaining the physical location of the faulty photovoltaic string based on the logical location of the faulty photovoltaic string and the first correspondence between a logical location of a photovoltaic string and a physical location, the processing module is further configured to obtain, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. The processing module is further configured to: when the physical location of the first photovoltaic string in the physical map is different from a first actual physical location of the first photovoltaic string, update the physical location of the photovoltaic string in the physical map to the first actual physical location, to obtain the updated physical map.

In a possible implementation, the transceiver module is further configured to receive a first infrared image from the image collection terminal. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string.

The processing module is further configured to obtain, based on the first infrared image, a physical location of a photovoltaic string whose image feature is different from the image feature corresponding to another photovoltaic string, to obtain the first actual physical location.

In a possible implementation, the physical map is further used to indicate a relative physical location relationship between the plurality of photovoltaic strings.

The processing module is configured to obtain the first actual physical location based on the relative physical location relationship between the plurality of photovoltaic strings and the first infrared image.

In a possible implementation, before receiving the first infrared image from the image collection terminal, the transceiver module is further configured to send a control indication to the inverter. The control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

In a possible implementation, the transceiver module is further configured to receive the first actual physical location sent from the first photovoltaic string.

In a possible implementation, the transceiver module is further configured to receive a fault type of a faulty photovoltaic module from the image collection terminal, where the faulty photovoltaic module is at least one photovoltaic module of the faulty photovoltaic string, the fault type of the faulty photovoltaic module is obtained by the image collection terminal based on a second infrared image including the faulty photovoltaic module, and the second infrared image is obtained through photographing performed by the image collection terminal based on the physical location of the faulty photovoltaic string.

According to a fifth aspect, an embodiment may provide a computer readable storage medium. The computer readable storage medium stores a computer program. The program is executed by a processor to perform the method according to any one of the first aspect, the second aspect, or any possible implementation of the first aspect and the second aspect.

According to a sixth aspect, an embodiment may provide a computer program product including instructions. When the computer program product runs on a computer, the computer is enabled to perform the method according to any one of the first aspect, the second aspect, or any possible implementation of the first aspect and the second aspect. The computer program product may be all or partially stored in a storage medium encapsulated inside the processor or may be all or a partially stored in a storage medium encapsulated outside the processor.

According to a seventh aspect, an embodiment may provide an electronic apparatus. The electronic apparatus may be a chip or an apparatus including the chip. The chip includes a processor and a data interface. The processor uses the data interface to read instructions stored in a memory, to perform the method according to any one of the first aspect, the second aspect, or any possible implementation of the first aspect and the second aspect.

Optionally, in an implementation, the chip may further include a memory. The memory stores the instructions. The processor is configured to execute the instructions stored in the memory. When the instructions are executed, the processor is configured to perform the method according to any one of the first aspect, the second aspect, or any possible implementation of the first aspect and the second aspect.

According to an eighth aspect, an embodiment may provide a photovoltaic string location update system. The photovoltaic string location update system includes a photovoltaic power station management system. The photovoltaic power station management system is configured to perform the method according to any one of the first aspect, the second aspect, or any possible implementation of the first aspect and the second aspect.

BRIEF DESCRIPTION OF THE DRAWINGS

The following briefly describes the accompanying drawings used in describing the embodiments or the conventional technologies.

DETAILED DESCRIPTION OF THE EMBODIMENTS

The following describes the embodiments with reference to accompanying drawings.

In the embodiments and accompanying drawings, the terms "target", "second", and the like are intended to distinguish between different objects but do not indicate a particular order.

Figure 1:
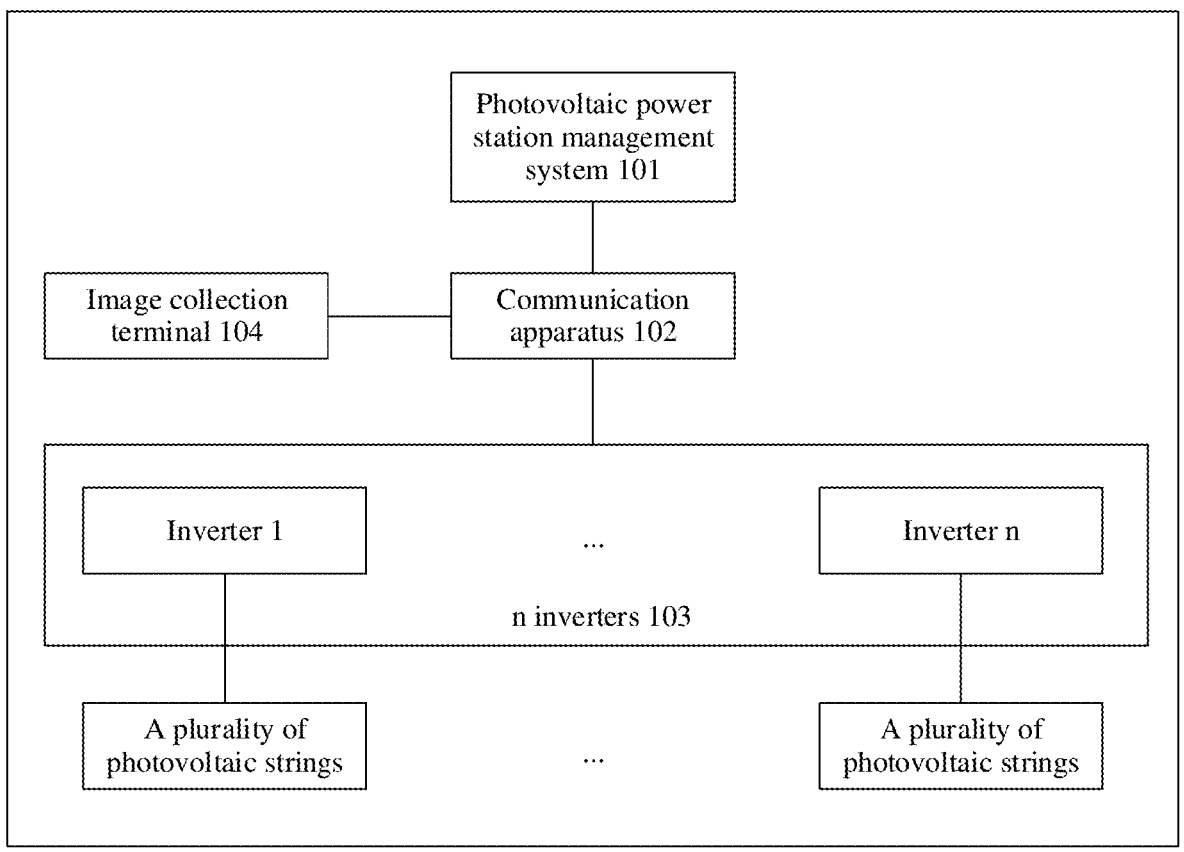
FIG. 1 is a diagram of an architecture of a photovoltaic string location update system according to an embodiment.

First, FIG. 1 is a diagram of an architecture of a photovoltaic string location update system according to an embodiment. As shown in FIG. 1, the photovoltaic string location update system includes a photovoltaic power station management system 101, a communication apparatus 102, n inverters 103, and an image collection terminal 104. The photovoltaic power station management system 101 is a device having a data processing capability and a data storage capability. The communication apparatus 102 is separately connected to the photovoltaic power station management system 101, each of the n inverters 103, and the image collection terminal 104, to implement transmission of data, instructions, and the like. For example, the photovoltaic power station management system 101 may send instructions to an inverter 1 in the n inverters 103 by using the communication apparatus 102. The image collection terminal 104 may send data and the like to the photovoltaic power station management system 101 by using the communication apparatus 102. It may be understood that the communication apparatus 102 may be, for example, a data collector.

In addition, the n inverters 103 include the inverter 1 to an inverter n. Each of the n inverters 103 is connected to a plurality of photovoltaic strings. For example, the inverter 1 is connected to a plurality of photovoltaic strings, and the inverter n is connected to a plurality of photovoltaic strings. The image collection terminal 104 is a removable device capable of data processing, data storage, and infrared image photographing. For example, the image collection terminal 104 is a drone capable of data processing, data storage, and infrared image photographing.

Figure 2:
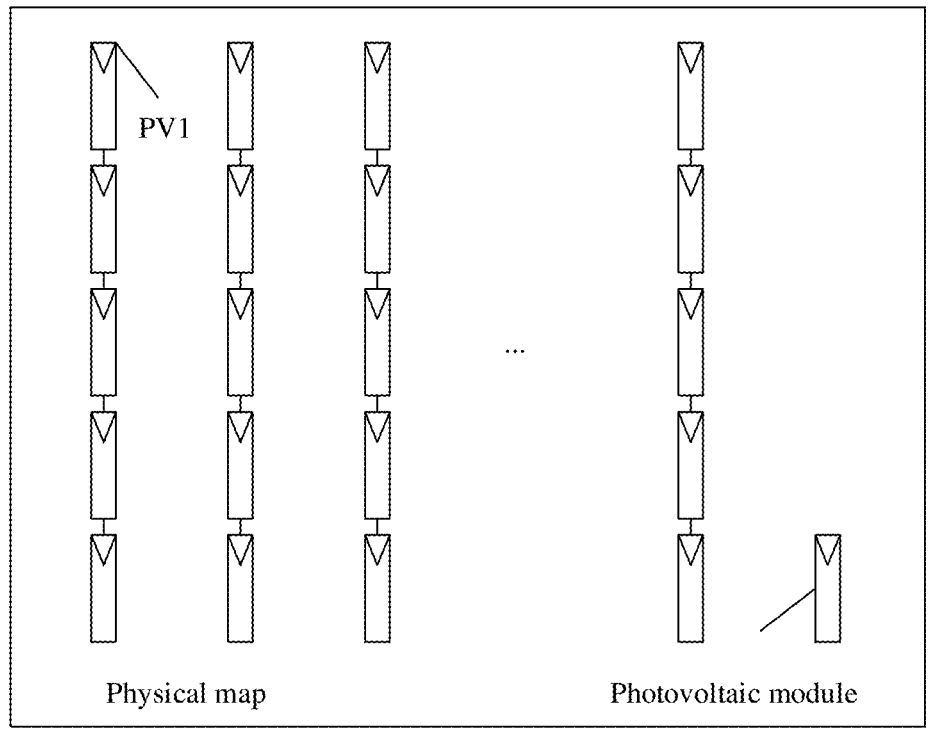
FIG. 2 is a schematic diagram of an actual physical location of a photovoltaic string and a physical location in a physical map according to an embodiment.
Figure 2:
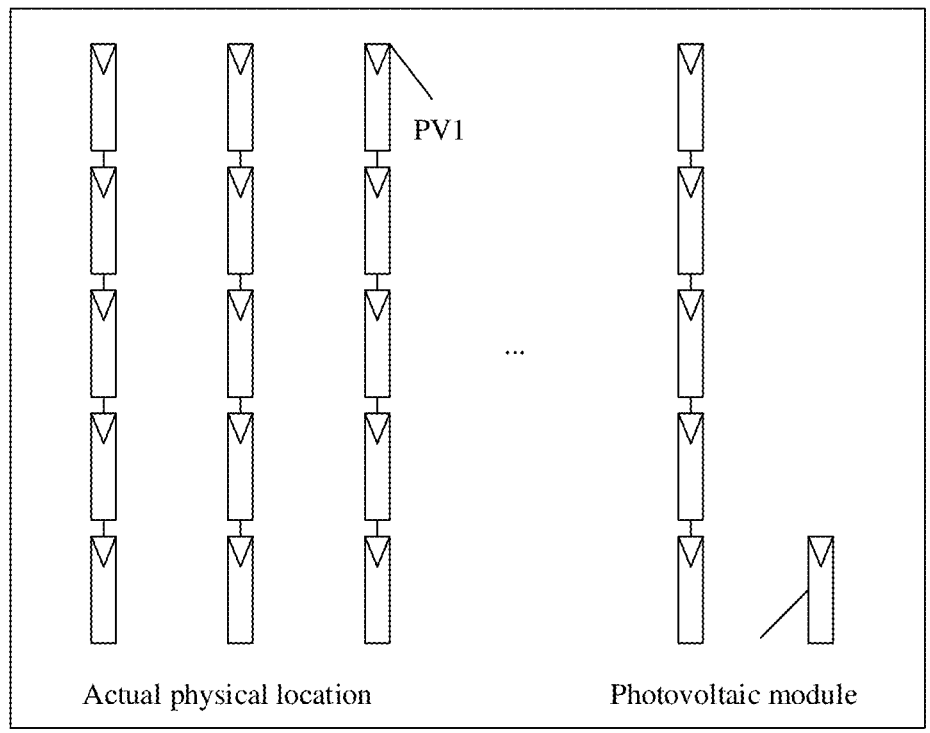

FIG. 2 is a schematic diagram of an actual physical location of a photovoltaic string and a physical location in a physical map according to an embodiment. As shown in FIG. 2, the physical map includes a plurality of photovoltaic strings. Each of the plurality of photovoltaic strings includes five photovoltaic modules connected in series. Further, a physical location corresponding to a photovoltaic string PV1 in the physical map is Row 1 and Column 1. In addition, there are a plurality of photovoltaic strings for an actual physical location. Each of the plurality of photovoltaic strings includes five photovoltaic modules connected in series. Further, it can be understood that an actual physical location corresponding to the photovoltaic string PV1 is Row 1 and Column 3. Therefore, the actual physical location of the photovoltaic string PV1 is inconsistent with the physical location in the physical map. As a result, subsequent operation and maintenance cannot be accurately performed on the photovoltaic module.

On this basis, an embodiment may provide a photovoltaic string location update method to resolve the foregoing problem. The following describes this embodiment in detail.

Figure 3:
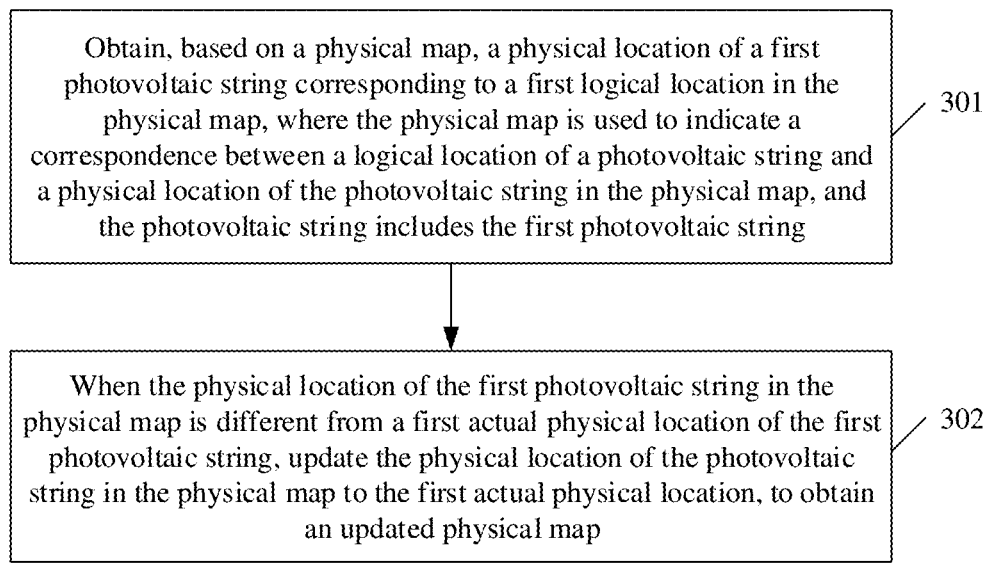
FIG. 3 is a schematic flowchart of a photovoltaic string location update method according to an embodiment.

The photovoltaic string location update method provided in this embodiment may be applied to an electronic apparatus. The electronic apparatus may be, for example, a photovoltaic power station management system, a chip, or an apparatus including the chip. The following uses the photovoltaic power station management system as an example. FIG. 3 is a schematic flowchart of a photovoltaic string location update method according to an embodiment. As shown in FIG. 3, the method includes the following steps:

301: A photovoltaic power station management system obtains, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string.

The first logical location is an identifier corresponding to the first photovoltaic string. For example, the first logical location may be a number corresponding to the first photovoltaic string. Further, the number corresponding to the first photovoltaic string is obtained through coding.

302: When the physical location of the first photovoltaic string in the physical map is different from a first actual physical location of the first photovoltaic string, the photovoltaic power station management system updates the physical location of the photovoltaic string in the physical map to the first actual physical location, to obtain the updated physical map.

Figure 4:
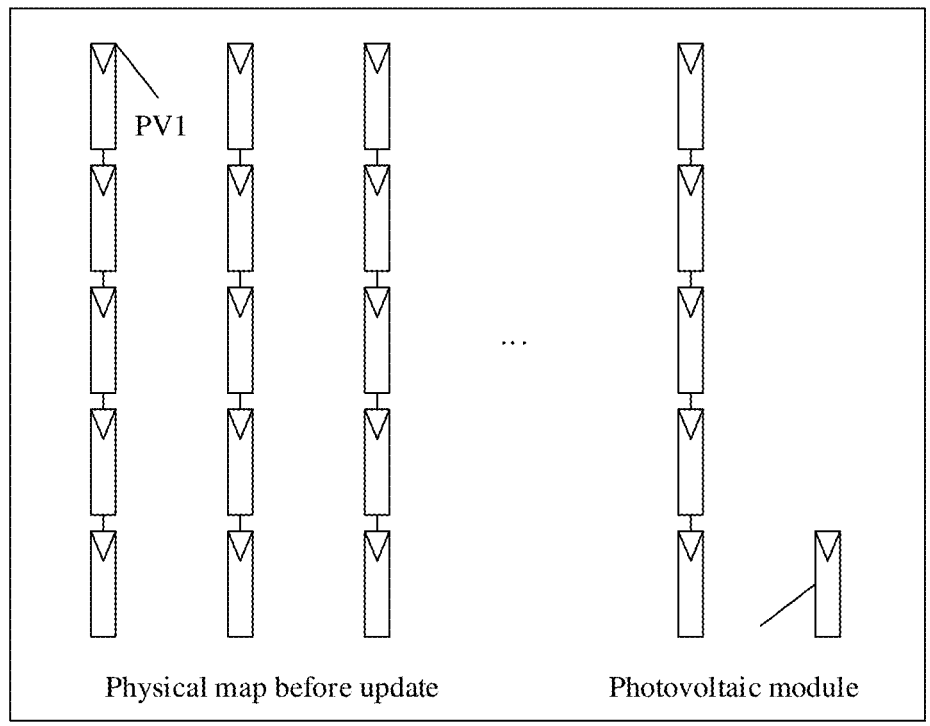
FIG. 4 is a schematic diagram of a physical map before being updated and a physical map after being updated according to an embodiment.
Figure 4:
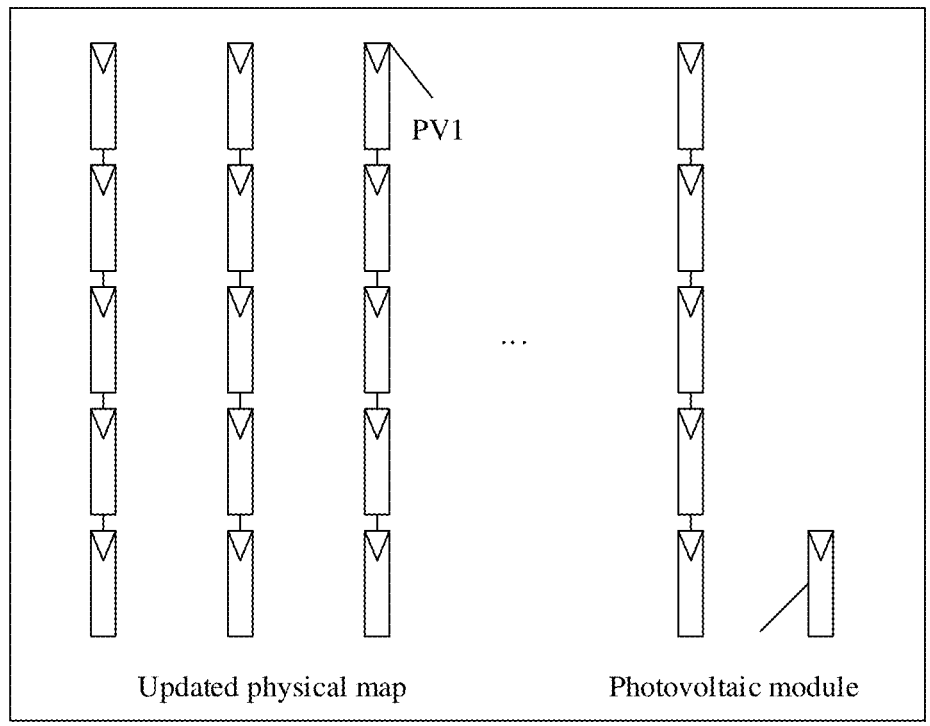

For example, FIG. 4 is a schematic diagram of a physical map before being updated and a physical map after being updated according to an embodiment. As shown in FIG. 4, the physical map, before being updated, may include a plurality of photovoltaic strings. Each of the plurality of photovoltaic strings includes five photovoltaic modules connected in series. A physical location corresponding to a photovoltaic string PV1 in the physical map before being updated is Row 1 and Column 1. Further, the first logical location of the photovoltaic string in the physical map before being updated is PV1. It can be understood that the physical map before being updated includes a correspondence between PV1 and Row 1 and Column 1. In addition, the physical map after being updated includes a plurality of photovoltaic strings. Each of the plurality of photovoltaic strings includes five photovoltaic modules connected in series. A physical location of the photovoltaic string PV1 in the physical map after being updated is Row 1 and Column 3. In other words, a first actual physical location of the photovoltaic string PV1 is Row 1 and Column 3. Further, the physical map after being updated includes a correspondence between PV1 and Row 1 and Column 3.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on the photovoltaic module.

Figure 5:
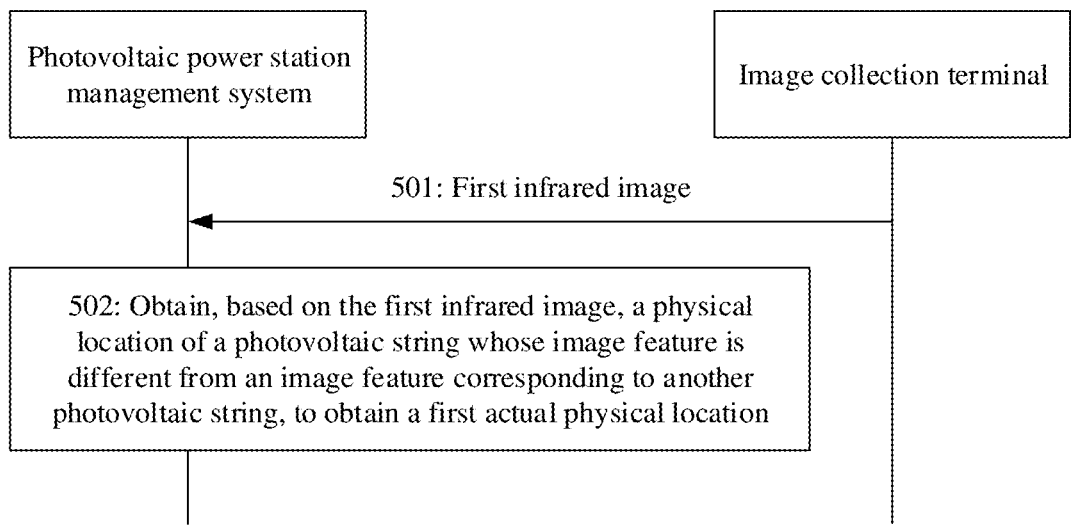
FIG. 5 is a schematic flowchart of another photovoltaic string location update method according to an embodiment.

FIG. 5 is a schematic flowchart of another photovoltaic string location update method according to an embodiment. As shown in FIG. 5, the method further includes the following steps:

501: An image collection terminal sends a first infrared image to a photovoltaic power station management system. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string.

Because detectable light intensity of the first photovoltaic string is higher than or lower than detectable light intensity of another photovoltaic string, the image feature corresponding to the first photovoltaic string in the first infrared image is different from the image feature corresponding to another photovoltaic string. In addition, another element or elements may also be used to enable the image feature corresponding to the first photovoltaic string in the first infrared image to be different from the image feature corresponding to another photovoltaic string. This is not limited in the embodiments.

502: The photovoltaic power station management system obtains, based on the first infrared image, a physical location of a photovoltaic string whose image feature is different from the image feature corresponding to another photovoltaic string, to obtain the first actual physical location.

The physical map is further used to indicate a relative location relationship between the plurality of photovoltaic strings. The obtaining, based on the first infrared image, a physical location of a photovoltaic string whose image feature is different from the image feature corresponding to another photovoltaic string, to obtain the first actual physical location includes: obtaining the first actual physical location based on the relative physical location relationship between the plurality of photovoltaic strings and the first infrared image.

Figure 6:
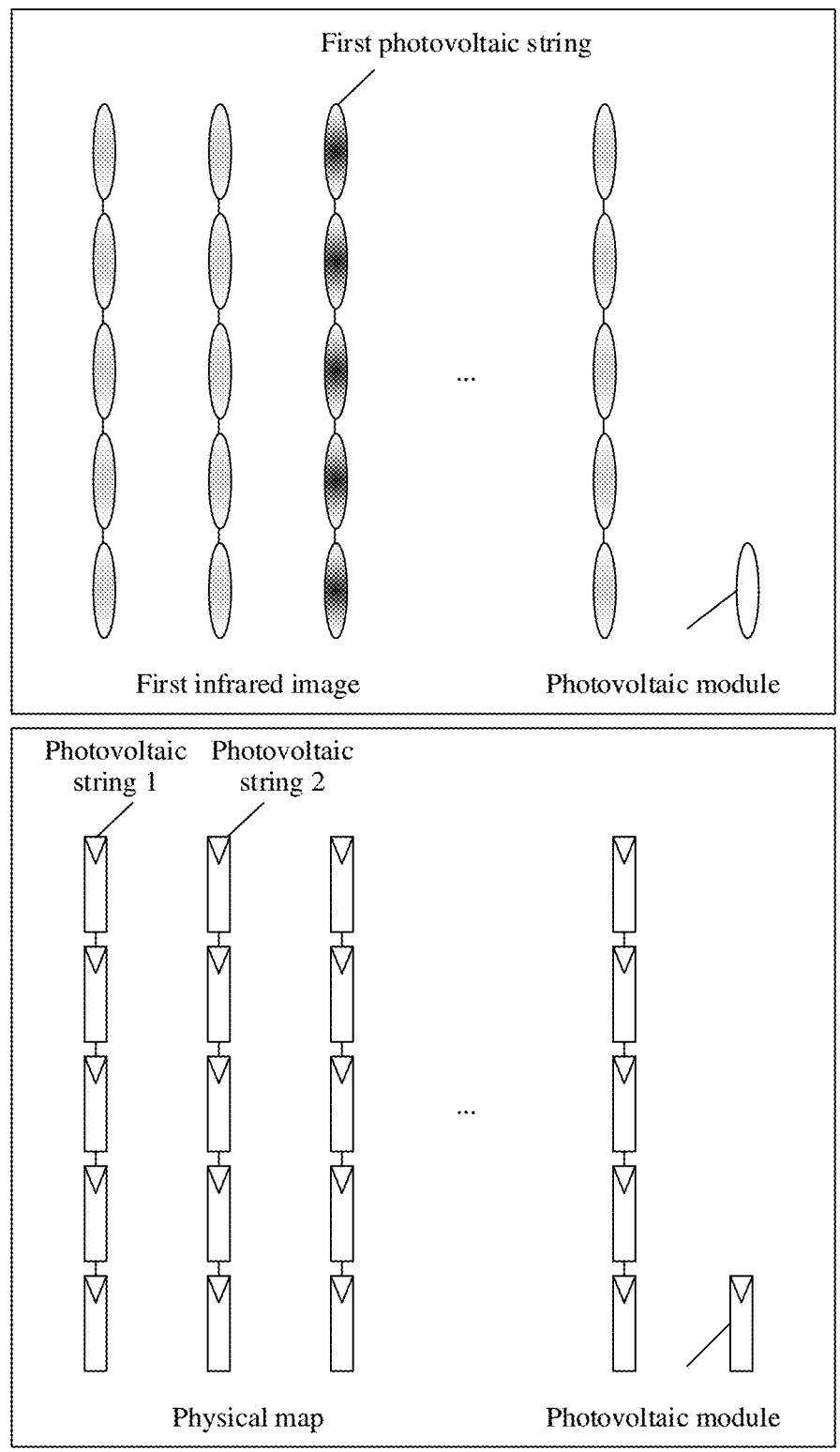
FIG. 6 is a schematic diagram of a first infrared image and a physical map according to an embodiment.

For example, FIG. 6 is a schematic diagram of a first infrared image and a physical map according to an embodiment. As shown in FIG. 6, the first infrared image includes a plurality of photovoltaic strings. Each of the plurality of photovoltaic strings includes five photovoltaic modules connected in series. Because the detectable light intensity of the first photovoltaic string is higher than or lower than the detectable light intensity of another photovoltaic string, the image feature corresponding to the first photovoltaic string in the first infrared image is different from the image feature corresponding to another photovoltaic string. In other words, the first photovoltaic string may be distinguished from the plurality of photovoltaic strings based on the first infrared image. Further, the physical map includes a relative location relationship between the plurality of photovoltaic strings. For example, a relative location relationship between a photovoltaic string 1 and a photovoltaic string 2 is that the photovoltaic string 2 is located on a right side of the photovoltaic string 1. It may be understood that, based on the relative location relationship between the plurality of photovoltaic strings and the first infrared image, it can be understood that the first photovoltaic string is located in Row 1 and Column 3. In other words, the first actual physical location of the first photovoltaic string is Row 1 and Column 3.

The actual physical location of the photovoltaic string may be obtained based on the infrared image to prepare for subsequent update of the physical map based on the actual physical location of the photovoltaic string.

Optionally, in a possible implementation, before the first infrared image is received from the image collection terminal, the method further includes: sending a control indication to an inverter. The control indication is used to indicate the inverter to control the detectable light intensity of the first photovoltaic string to be higher than or lower than the detectable light intensity of another photovoltaic string. The first infrared image is an infrared image obtained after the image collection terminal photographs the plurality of photovoltaic strings when the detectable light intensity of the first photovoltaic string is higher than or lower than the detectable light intensity of another photovoltaic string.

The inverter is connected to the plurality of photovoltaic strings.

The control indication carries a threshold. The control indication is used to indicate the inverter to control the detectable light intensity of the first photovoltaic string to be higher than or lower than the threshold. The detectable light intensity of another photovoltaic string is lower than the threshold.

Further, the control indication is used to indicate the inverter to control the detectable light intensity of the first photovoltaic string to be higher than or lower than the threshold through adjusting an electrical performance parameter of the first photovoltaic string and control the detectable light intensity of another photovoltaic string to be lower than the threshold through adjusting an electrical performance parameter of another photovoltaic string. The electrical performance parameter includes a current or a voltage. Alternatively, the control indication is used to indicate the inverter to control the detectable light intensity of the first photovoltaic string to be higher than or lower than the threshold through switching an operation mode of the first photovoltaic string and control the detectable light intensity of another photovoltaic string to be lower than the threshold through switching an operation mode of another photovoltaic string. The operation mode of the first photovoltaic string includes an open circuit, a short circuit, and a closed circuit. Further, the control indication is used to indicate the inverter to control the detectable light intensity of the first photovoltaic string to be higher than or lower than the threshold through switching the first photovoltaic string from a closed circuit to an open circuit, and control the detectable light intensity of the another photovoltaic string to be lower than the threshold through switching the operation mode of the another photovoltaic string to a closed circuit.

When the electrical performance parameter of the first photovoltaic string is adjusted, the detectable light intensity of the first photovoltaic string may be higher than or lower than the threshold in a current backflow manner, or the detectable light intensity of the first photovoltaic string may be higher than or lower than the threshold in a voltage backflow manner. This is not limited in the embodiments.

In addition, there are a plurality of maximum power point tracking (MPPT) solar controllers in the inverter. The first photovoltaic string is connected to a first MPPT in the plurality of MPPTs. The control indication is used to indicate the first MPPT in the inverter to control the detectable light intensity of the first photovoltaic string to be higher than or lower than the threshold, and another MPPT in the inverter to control the detectable light intensity of another photovoltaic string to be lower than the threshold.

Further, the control indication is used to indicate the first MPPT in the inverter to control the detectable light intensity of the first photovoltaic string to be higher than or lower than the threshold through adjusting the electrical performance parameter of the first photovoltaic string, and the another MPPT in the inverter to control the detectable light intensity of the another photovoltaic string to be lower than the threshold through adjusting the electrical performance parameter of the another photovoltaic string. Alternatively, the control indication is used to indicate the first MPPT in the inverter to control the detectable light intensity of the first photovoltaic string to be higher than or lower than the threshold through switching the operation mode of the first photovoltaic string, and the another MPPT in the inverter to control the detectable light intensity of the another photovoltaic string to be lower than the threshold through switching the operation mode of the another photovoltaic string. In other words, the control indication is used to indicate the first MPPT in the inverter to control the detectable light intensity of the first photovoltaic string to be higher than or lower than the threshold through switching the first photovoltaic string from a closed circuit to an open circuit, and the another MPPT in the inverter to control the detectable light intensity of the another photovoltaic string to be lower than the threshold through switching the operation mode of the another photovoltaic string to a closed circuit.

Further, in a possible implementation, before the first infrared image is received from the image collection terminal, the method further includes: sending a control indication to a combiner box. The control indication is used to indicate the inverter to control the detectable light intensity of the first photovoltaic string to be higher than or lower than the detectable light intensity of another photovoltaic string. The first infrared image is an infrared image obtained after the image collection terminal photographs the plurality of photovoltaic strings when the detectable light intensity of the first photovoltaic string is higher than or lower than the detectable light intensity of another photovoltaic string.

The combiner box is connected to the plurality of photovoltaic strings. Further, the control indication is used to indicate the combiner box to control the detectable light intensity of the first photovoltaic string to be higher than or lower than the threshold through adjusting an electrical performance parameter of the first photovoltaic string, and control the detectable light intensity of another photovoltaic string to be lower than the threshold through adjusting an electrical performance parameter of another photovoltaic string. The electrical performance parameter includes a current or a voltage. Alternatively, the control indication is used to indicate the combiner box to control the detectable light intensity of the first photovoltaic string to be higher than or lower than the threshold through switching an operation mode of the first photovoltaic string and control the detectable light intensity of another photovoltaic string to be lower than the threshold through switching an operation mode of another photovoltaic string. The operation mode of the first photovoltaic string includes an open circuit, a short circuit, and a closed circuit. Further, the control indication is used to indicate the combiner box to control the detectable light intensity of the first photovoltaic string to be higher than or lower than the threshold through switching the first photovoltaic string from a closed circuit to an open circuit, and control the detectable light intensity of the another photovoltaic string to be lower than the threshold through switching the operation mode of the another photovoltaic string to a closed circuit.

In addition, an operation may be performed on the combiner box in a manual manner, so that the detectable light intensity of the first photovoltaic string is higher than or lower than the detectable light intensity of another photovoltaic string.

Further, in the daytime, another photovoltaic string is in a closed circuit; or at night, another photovoltaic string is in a closed state. In other words, when the detectable light intensity of the first photovoltaic string is higher than or lower than the detectable light intensity of another photovoltaic string. A related operation does not need to be performed on another photovoltaic string.

The control indication may further carry a preset detection sequence. The control indication is used to indicate the inverter to perform actual physical location detection on the plurality of photovoltaic strings according to the preset detection sequence. During each time of actual physical location detection, the inverter controls detectable light intensity of a photovoltaic string in the plurality of photovoltaic strings to be higher than or lower than the threshold, and detectable light intensity of a photovoltaic string other than the photovoltaic string in the plurality of photovoltaic strings to be lower than the threshold. The image collection terminal obtains an infrared image through photographing when the detectable light intensity of the photovoltaic string in the plurality of photovoltaic strings is higher than or lower than the threshold, and the detectable light intensity of the photovoltaic string other than the photovoltaic string in the plurality of photovoltaic strings is lower than the threshold.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the physical map and the infrared image.

Optionally, in a possible implementation, the method further includes:
receiving the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

The actual physical location of the photovoltaic string may be obtained to prepare for subsequent update of the physical map based on the actual physical location of the photovoltaic string.

Figure 7:
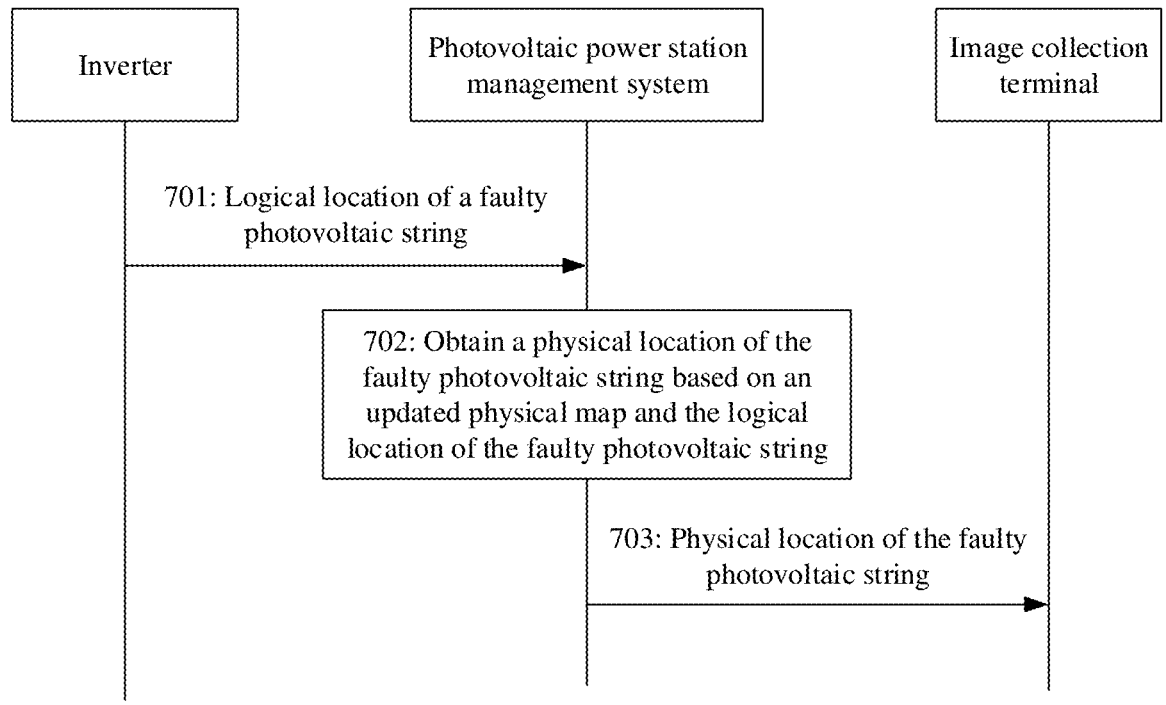
FIG. 7 is a schematic flowchart of another photovoltaic string location update method according to an embodiment.

FIG. 7 is a schematic flowchart of another photovoltaic string location update method according to an embodiment. As shown in FIG. 7, the method further includes the following steps:

701: An inverter sends a logical location of a faulty photovoltaic string to a photovoltaic power station management system.

The logical location of the faulty photovoltaic string is an identifier corresponding to the faulty photovoltaic string. For example, the logical location of the faulty photovoltaic string may be a number corresponding to the faulty photovoltaic string. Further, the number corresponding to the faulty photovoltaic string is obtained through coding.

In a possible implementation, before the logical location of the faulty photovoltaic string is received from the inverter, the method further includes: sending a fault detection indication to the inverter. The fault detection indication is used to indicate the inverter to perform fault detection on each of the plurality of photovoltaic strings. When the fault detection function is implemented, the inverter obtains a current value and a voltage value of each of the plurality of photovoltaic strings, and then processes the current value and the voltage value of each of the plurality of photovoltaic strings by using a first fault identification algorithm, to obtain a faulty photovoltaic string from the plurality of photovoltaic strings. A photovoltaic string having a current value and a voltage value different from a standard current value and a standard voltage value is screened by using the first fault identification algorithm. The fault detection indication may carry the standard current value and the standard voltage value.

702: The photovoltaic power station management system obtains a physical location of the faulty photovoltaic string based on an updated physical map and the logical location of the faulty photovoltaic string.

The second photovoltaic string is another photovoltaic string. The updated physical map is further used to indicate a correspondence between a second logical location of a second photovoltaic string and a second actual physical location. Alternatively, the updated physical map is further used to indicate a correspondence between a second logical location of the second photovoltaic string and a physical location of the second photovoltaic string in the physical map. The second logical location is an identifier corresponding to the second photovoltaic string. For example, the second logical location may be a number corresponding to the second photovoltaic string.

For another photovoltaic string, the second actual physical location of another photovoltaic string may be the same as or different from the physical location in the physical map. When the second actual physical location is the same as the physical location, the correspondence between the second logical location of another photovoltaic string and the physical location does not need to be updated in the physical map. When the second actual physical location is different from the physical location, the correspondence between the second logical location of another photovoltaic string and the physical location needs to be updated in the physical map.

703: An image collection terminal receives the physical location of the faulty photovoltaic string sent by the photovoltaic power station management system. The physical location of the faulty photovoltaic string is used by the image collection terminal to perform photographing.

When the logical location of the faulty photovoltaic string is roughly determined, the physical location of the faulty photovoltaic string may be obtained based on the updated physical map, to prepare for photographing performed by the image collection terminal based on the physical location of the faulty photovoltaic string.

Optionally, in a possible implementation, the method further includes: receiving a fault type of the faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

The fault type of the faulty photovoltaic module is obtained through processing the second infrared image by using a second fault identification algorithm by the image collection terminal. The second fault identification algorithm is used to compare the second infrared image with a plurality of template images, to set at least one fault type in one-to-one correspondence with at least one template image in the plurality of template images to the fault type corresponding to the second infrared image. Each of the plurality of template images corresponds to one fault type. Further, the fault type of the faulty photovoltaic module includes at least one of the following: abnormal attenuation of output power of a photovoltaic module, potential induced degradation PID of a photovoltaic module, a failure of a battery unit in a photovoltaic module, a current mismatch of a photovoltaic module, a hot spot of a photovoltaic module, a short circuit of a diode in a photovoltaic module, a broken glass panel of a photovoltaic module, an open circuit in a photovoltaic module, or blocking of a photovoltaic module.

The faulty photovoltaic module may be finely determined and the fault type of the faulty photovoltaic module may be obtained to prepare for subsequent operation and maintenance.

The embodiments may provide another photovoltaic string location update method. The method may be applied to an electronic apparatus. The electronic apparatus may be, for example, a photovoltaic power station management system, a chip, or an apparatus including the chip. The method includes: receiving a logical location of a faulty photovoltaic string that is sent from an inverter; and obtaining a physical location of a faulty photovoltaic string based on the logical location of the faulty photovoltaic string; sending a physical location of the faulty photovoltaic string to an image collection terminal, where the physical location of the faulty photovoltaic string is used by the image collection terminal to perform photographing.

The logical location of the faulty photovoltaic string that is sent from the inverter is received. For this process, refer to step 701 in FIG. 7. The physical location of the faulty photovoltaic string is sent to the image collection terminal. For this process, refer to step 703 in FIG. 7.

When the logical location of the faulty photovoltaic string is roughly determined, the physical location of the faulty photovoltaic string may be obtained, to prepare for photographing performed by the image collection terminal based on the physical location of the faulty photovoltaic string.

In a possible implementation, the obtaining a physical location of a faulty photovoltaic string based on the logical location of the faulty photovoltaic string includes: obtaining the physical location of the faulty photovoltaic string based on the logical location of the faulty photovoltaic string and a correspondence between a logical location of a photovoltaic string and a physical location.

When the logical location of the faulty photovoltaic string is roughly determined, the physical location of the faulty photovoltaic string may be obtained based on the correspondence between a logical location of a photovoltaic string and a physical location.

In a possible implementation, before obtaining the physical location of the faulty photovoltaic string based on the logical location of the faulty photovoltaic string and the first correspondence between a logical location of a photovoltaic string and a physical location, the method further includes: obtaining, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. When the physical location of the first photovoltaic string in the physical map is different from a first actual physical location of the first photovoltaic string, the physical location of the photovoltaic string in the physical map is updated to the first actual physical location, to obtain the updated physical map.

The physical location of the first photovoltaic string corresponding to the first logical location in the physical map is obtained based on the physical map. For this process, refer to step 301 in FIG. 3. When the physical location of the first photovoltaic string in the physical map is different from the first actual physical location of the first photovoltaic string, the physical location of the photovoltaic string in the physical map is updated to the first actual physical location, to obtain the updated physical map. For this process, refer to step 302 in FIG. 3.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on the photovoltaic module. In addition, when the logical location of the faulty photovoltaic string is subsequently roughly determined, the physical location of the faulty photovoltaic string is obtained based on the correspondence between a logical location of a photovoltaic string and a physical location.

In a possible implementation, the method further includes: receiving a first infrared image from an image collection terminal, where the first infrared image includes a plurality of photovoltaic strings, the first photovoltaic string is one of the plurality of photovoltaic strings, and an image feature corresponding to the first photovoltaic string in the first infrared image is different from an image feature corresponding to another photovoltaic string; and obtaining, based on the first infrared image, a physical location of a photovoltaic string whose image feature is different from the image feature corresponding to the another photovoltaic string, to obtain the first actual physical location.

The first infrared image is received from the image collection terminal. For this process, refer to step 501 in FIG. 5. The physical location of the photovoltaic string whose image feature is different from the image feature corresponding to another photovoltaic string is obtained based on the first infrared image, to obtain the first actual physical location. For this process, refer to step 502 in FIG. 5.

The actual physical location of the photovoltaic string may be obtained based on the infrared image to prepare for subsequent update of the physical map based on the actual physical location of the photovoltaic string.

In a possible implementation, the physical map is further used to indicate a relative physical location relationship between the plurality of photovoltaic strings. The obtaining, based on the first infrared image, a physical location of the photovoltaic string whose image feature is different from the image feature corresponding to another photovoltaic string, to obtain the first actual physical location includes: obtaining the first actual physical location based on the relative physical location relationship between the plurality of photovoltaic strings and the first infrared image.

The actual physical location of the photovoltaic string may be obtained based on the infrared image to prepare for subsequent update of the physical map.

In a possible implementation, before the first infrared image is received from the image collection terminal, the method further includes: sending a control indication to an inverter. The control indication is used to indicate the inverter to control the detectable light intensity of the first photovoltaic string to be higher than or lower than the detectable light intensity of another photovoltaic string. The first infrared image is an infrared image obtained after the image collection terminal photographs the plurality of photovoltaic strings when the detectable light intensity of the first photovoltaic string is higher than or lower than the detectable light intensity of another photovoltaic string.

The control indication is sent to the inverter. For this process, refer to related content of the control indication in FIG. 5.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the physical map and the infrared image.

In a possible implementation, the method further includes: receiving the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

The actual physical location of the photovoltaic string may be obtained to prepare for subsequent update of the physical map based on the actual physical location of the photovoltaic string.

In a possible implementation, the method further includes:
  receiving a fault type of the faulty photovoltaic module from the image collection terminal, where the faulty photovoltaic module is at least one photovoltaic module of the faulty photovoltaic string, the fault type of the faulty photovoltaic module is obtained by the image collection terminal based on a second infrared image including the faulty photovoltaic module, and the second infrared image is obtained through photographing performed by the image collection terminal based on the physical location of the faulty photovoltaic string.

For the fault type, refer to related content of the fault type in FIG. 7.

The faulty photovoltaic module may be finely determined and the fault type of the faulty photovoltaic module may be obtained to prepare for subsequent operation and maintenance.

Figure 8:
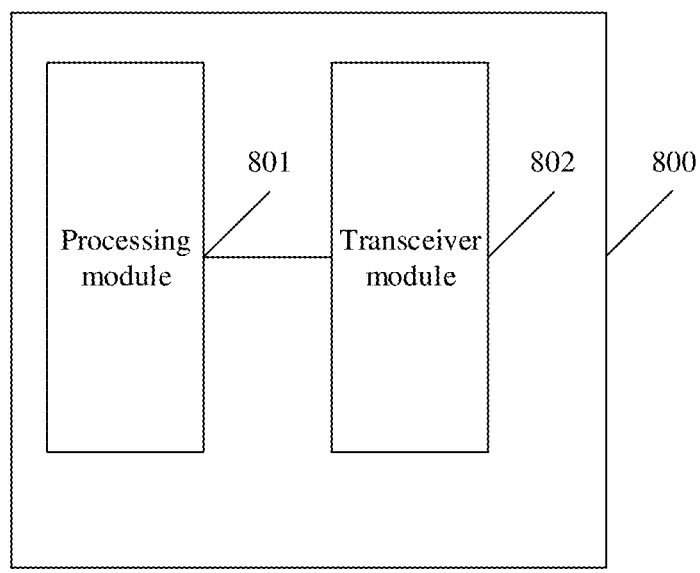
FIG. 8 is a schematic diagram of a structure of a photovoltaic string location update apparatus according to an embodiment.

FIG. 8 is a schematic diagram of a structure of a photovoltaic string location update apparatus according to an embodiment. The apparatus 800 may be applied to the methods shown in FIG. 3 to FIG. 7. As shown in FIG. 8, the apparatus 800 includes a processing module 801 and a transceiver module 802.

The processing module 801 is configured to obtain, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. The processing module 801 is further configured to: when the physical location of the first photovoltaic string in the physical map is different from a first actual physical location of the first photovoltaic string, update the physical location of the photovoltaic string in the physical map to the first actual physical location, to obtain the updated physical map.

The physical location of the first photovoltaic string corresponding to the first logical location in the physical map is obtained based on the physical map. For this process, refer to step 301 in FIG. 3. When the physical location of the first photovoltaic string in the physical map is different from the first actual physical location of the first photovoltaic string, the physical location of the photovoltaic string in the physical map is updated to the first actual physical location, to obtain the updated physical map. For this process, refer to step 302 in FIG. 3.

In a possible implementation, the apparatus further includes a transceiver module.

The transceiver module 802 is configured to receive a first infrared image from an image collection terminal. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string. The processing module 801 is further configured to obtain, based on the first infrared image, a physical location of a photovoltaic string whose image feature is different from the image feature corresponding to another photovoltaic string, to obtain the first actual physical location.

The first infrared image is received from the image collection terminal. For this process, refer to step 501 in FIG. 5. The physical location of the photovoltaic string whose image feature is different from the image feature corresponding to another photovoltaic string is obtained based on the first infrared image, to obtain the first actual physical location. For this process, refer to step 502 in FIG. 5.

In a possible implementation, the physical map is further used to indicate a relative physical location relationship between the plurality of photovoltaic strings.

The processing module 801 is configured to obtain the first actual physical location based on the relative physical location relationship between the plurality of photovoltaic strings and the first infrared image.

In a possible implementation, before receiving the first infrared image sent by the image collection terminal, the transceiver module 802 is further configured to send a control indication to an inverter, where the control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

The control indication is sent to the inverter. For this process, refer to related content of the control indication in FIG. 5.

In a possible implementation, the apparatus further includes the transceiver module 802. The transceiver module 802 is configured to receive the first actual physical location sent from the first photovoltaic string.

In a possible implementation, the transceiver module 802 is further configured to receive a logical location of a faulty photovoltaic string that is sent by the inverter.

The processing module 801 is further configured to obtain a physical location of the faulty photovoltaic string based on the updated physical map and the logical location of the faulty photovoltaic string.

The transceiver module 802 is further configured to send the physical location of the faulty photovoltaic string to the image collection terminal. The physical location of the faulty photovoltaic string is used by the image collection terminal to perform photographing.

The logical location of the faulty photovoltaic string that is sent from the inverter is received. For this process, refer to step 701 in FIG. 7. The physical location of the faulty photovoltaic string is sent to the image collection terminal. For this process, refer to step 703 in FIG. 7.

In a possible implementation, the transceiver module 802 is further configured to receive a fault type of the faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

For the fault type, refer to related content of the fault type in FIG. 7.

Figure 9:
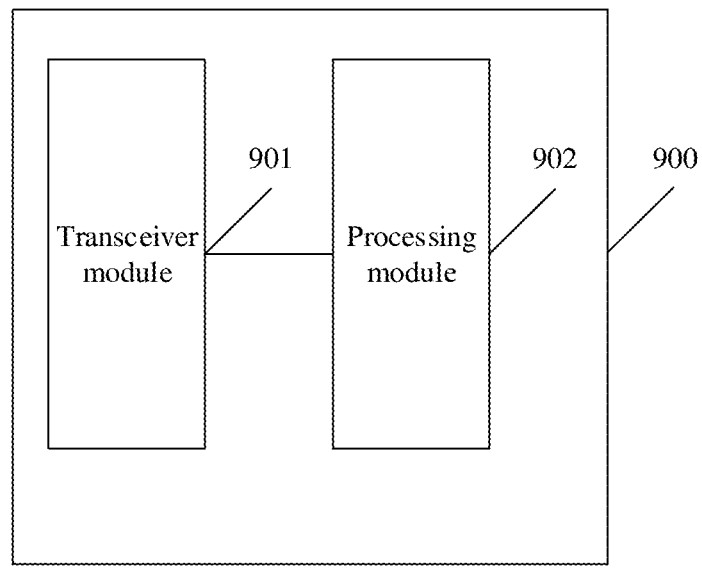
FIG. 9 is a schematic diagram of a structure of another photovoltaic string location update apparatus according to an embodiment.

FIG. 9 is a schematic diagram of a structure of another photovoltaic string location update apparatus according to an embodiment. The apparatus 900 may be applied to the methods shown in FIG. 3 to FIG. 7. As shown in FIG. 9, the apparatus 900 includes a transceiver module 901 and a processing module 902.

The transceiver module 901 is further configured to receive a logical location of a faulty photovoltaic string that is sent from an inverter. The processing module 902 is configured to obtain a physical location of the faulty photovoltaic string based on the logical location of the faulty photovoltaic string.

The transceiver module 901 is further configured to send the physical location of the faulty photovoltaic string to the image collection terminal. The physical location of the faulty photovoltaic string is used by the image collection terminal to perform photographing.

The logical location of the faulty photovoltaic string that is sent from the inverter is received. For this process, refer to step 701 in FIG. 7. The physical location of the faulty photovoltaic string is sent to the image collection terminal. For this process, refer to step 703 in FIG. 7. In a possible implementation, in the aspect of obtaining the physical location of the faulty photovoltaic string based on the logical location of the faulty photovoltaic string, the processing module 902 is configured to obtain the physical location of the faulty photovoltaic string based on the logical location of the faulty photovoltaic string and a correspondence between a logical location of a photovoltaic string and a physical location.

In a possible implementation, before obtaining the physical location of the faulty photovoltaic string based on the logical location of the faulty photovoltaic string and the first correspondence between a logical location of a photovoltaic string and a physical location, the processing module 902 is further configured to obtain, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. The processing module 902 is further configured to: when the physical location of the first photovoltaic string in the physical map is different from a first actual physical location of the first photovoltaic string, update the physical location of the photovoltaic string in the physical map to the first actual physical location, to obtain the updated physical map.

The physical location of the first photovoltaic string corresponding to the first logical location in the physical map is obtained based on the physical map. For this process, refer to step 301 in FIG. 3. When the physical location of the first photovoltaic string in the physical map is different from the first actual physical location of the first photovoltaic string, the physical location of the photovoltaic string in the physical map is updated to the first actual physical location, to obtain the updated physical map. For this process, refer to step 302 in FIG. 3.

In a possible implementation, the transceiver module 901 is further configured to receive a first infrared image from the image collection terminal. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string.

The processing module 902 is further configured to obtain, based on the first infrared image, a physical location of a photovoltaic string whose image feature is different from the image feature corresponding to another photovoltaic string, to obtain the first actual physical location.

The first infrared image is received from the image collection terminal. For this process, refer to step 501 in FIG. 5. The physical location of the photovoltaic string whose image feature is different from the image feature corresponding to another photovoltaic string is obtained based on the first infrared image, to obtain the first actual physical location. For this process, refer to step 502 in FIG. 5.

In a possible implementation, the physical map is further used to indicate a relative physical location relationship between the plurality of photovoltaic strings.

The processing module 902 is configured to obtain the first actual physical location based on the relative physical location relationship between the plurality of photovoltaic strings and the first infrared image.

In a possible implementation, before receiving the first infrared image from the image collection terminal, the transceiver module is further configured to send a control indication to the inverter. The control indication is used to indicate the inverter to control detectable light intensity of the first photovoltaic string to be higher than or lower than detectable light intensity of another photovoltaic string.

The first infrared image is an infrared image obtained after the image collection terminal photographs the plurality of photovoltaic strings when the detectable light intensity of the first photovoltaic string is higher than or lower than the detectable light intensity of another photovoltaic string.

The control indication is sent to the inverter. For this process, refer to related content of the control indication in FIG. 5.

In a possible implementation, the transceiver module 901 is further configured to receive the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

In a possible implementation, the transceiver module 901 is further configured to receive a fault type of a faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

For the fault type, refer to related content of the fault type in FIG. 7.

Figure 10:
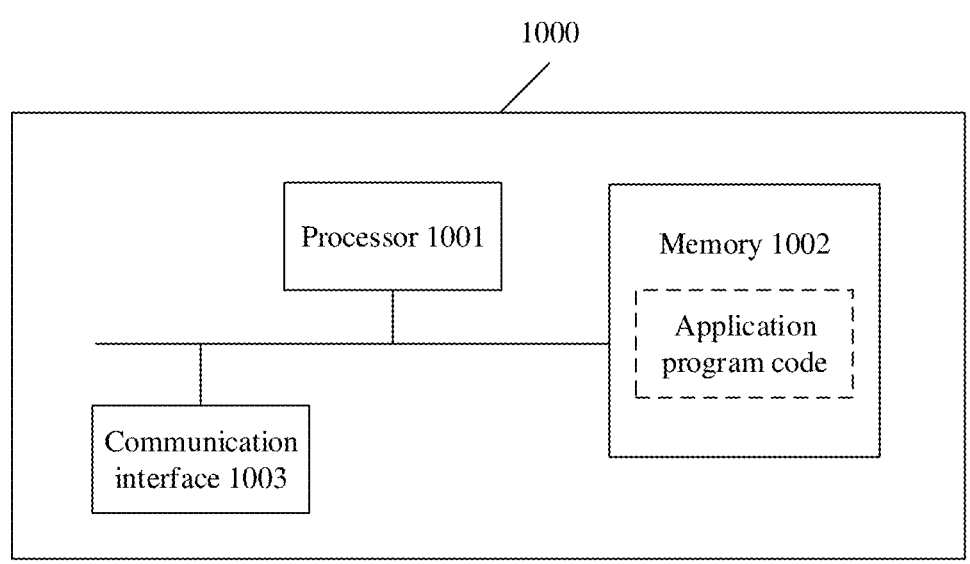
FIG. 10 is a schematic diagram of a structure of another photovoltaic string location update apparatus according to an embodiment.

FIG. 10 is a schematic diagram of a structure of another photovoltaic string location update apparatus according to an embodiment. As shown in FIG. 10, the apparatus 1000 includes at least one processor 1001, at least one memory 1002, and at least one communication interface 1003. The processor 1001, the memory 1002, and the communication interface 1003 are connected and communicate with each other by using a communication bus.

The processor 1001 may be a general-purpose central processing unit (CPU), a microprocessor, an application-specific integrated circuit (ASIC), or one or more integrated circuits configured to control execution of the foregoing solution program.

The memory 1002 may be, but is not limited to, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and that can be accessed by a computer. The memory may exist independently and is connected to the processor through the bus. The memory may alternatively be integrated with the processor.

The memory 1002 is configured to store application program code for performing a photovoltaic string location update method. The application program code is controlled and executed by the processor 1001. The processor 1001 is configured to execute the application program code stored in the memory 1002.

The communication interface 1003 is configured to communicate with another device or a communication network, for example, the Ethernet, a radio access network (RAN), and a wireless local area network (WLAN).

An embodiment may further provide a computer storage medium. The computer storage medium may store a program. When the program is executed, some or all steps of any photovoltaic string location update method recorded in the foregoing method embodiments are performed.

An embodiment may provide a photovoltaic string location update system. With reference to FIG. 1, the photovoltaic string location update system includes a photovoltaic power station management system. The photovoltaic power station management system is configured to obtain, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. The photovoltaic power station management system is further configured to: when the physical location of the first photovoltaic string in the physical map is different from a first actual physical location of the first photovoltaic string, update the physical location of the photovoltaic string in the physical map to the first actual physical location, to obtain the updated physical map.

The physical location of the first photovoltaic string corresponding to the first logical location in the physical map is obtained based on the physical map. For this process, refer to step 301 in FIG. 3. When the physical location of the first photovoltaic string in the physical map is different from the first actual physical location of the first photovoltaic string, the physical location of the photovoltaic string in the physical map is updated to the first actual physical location, to obtain the updated physical map. For this process, refer to step 302 in FIG. 3.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on a photovoltaic module.

In a possible implementation, the photovoltaic string location update system further includes an image collection terminal. The image collection terminal is configured to send a first infrared image to the photovoltaic power station management system. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string. The photovoltaic power station management system is configured to obtain, based on the first infrared image, a physical location of a photovoltaic string whose image feature is different from the image feature corresponding to another photovoltaic string, to obtain the first actual physical location.

The first infrared image is sent to the photovoltaic power station management system. For this process, refer to step 501 in FIG. 5. The physical location of the photovoltaic string whose image feature is different from the image feature corresponding to another photovoltaic string is obtained based on the first infrared image, to obtain the first actual physical location. For this process, refer to step 502 in FIG. 5.

The actual physical location of the photovoltaic string may be obtained based on the infrared image to prepare for subsequent update of the physical map.

In a possible implementation, the physical map is further used to indicate a relative physical location relationship between the plurality of photovoltaic strings. Based on the first infrared image, the photovoltaic station management system is configured to obtain the first actual physical location based on the relative physical location relationship between the plurality of photovoltaic strings and the first infrared image.

The actual physical location of the photovoltaic string may be obtained based on the infrared image to prepare for subsequent update of the physical map.

In a possible implementation, the photovoltaic string location update system further includes an inverter. The inverter is configured to receive a control indication from the photovoltaic power station management system. The control indication is used to indicate the inverter to control detectable light intensity of the first photovoltaic string to be higher than or lower than detectable light intensity of another photovoltaic string. The first infrared image is an infrared image obtained after the image collection terminal photographs the plurality of photovoltaic strings when the detectable light intensity of the first photovoltaic string is higher than or lower than the detectable light intensity of another photovoltaic string.

The control indication is received from the photovoltaic power station management system. For this process, refer to related content of the control indication in FIG. 5.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the infrared image.

In a possible implementation, the photovoltaic power station management system is configured to receive the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

The actual physical location of the photovoltaic string may be obtained to prepare for subsequent update of the physical map.

In a possible implementation, the inverter is further configured to send a logical location of a faulty photovoltaic string to the photovoltaic power station management system. The photovoltaic power station management system is further configured to obtain a physical location of the faulty photovoltaic string based on the updated physical map and the logical location of the faulty photovoltaic string. The image collection terminal is further configured to receive the physical location of the faulty photovoltaic string from the photovoltaic power station management system. The physical location of the faulty photovoltaic string is used by the image collection terminal to perform photographing.

The logical location of the faulty photovoltaic string is sent to the photovoltaic power station management system. For this process, refer to step 701 in FIG. 7. The physical location of the faulty photovoltaic string is received from the photovoltaic power station management system. For this process, refer to step 703 in FIG. 7.

When the logical location of the faulty photovoltaic string is roughly determined, the physical location of the faulty photovoltaic string may be obtained based on the updated physical map to prepare for photographing performed by the image collection terminal based on the physical location of the faulty photovoltaic string.

In a possible implementation, the photovoltaic power station management system is further configured to receive a fault type of a faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

For the fault type, refer to related content of the fault type in FIG. 7.

The faulty photovoltaic module may be finely determined and the fault type of the faulty photovoltaic module may be obtained to prepare for subsequent operation and maintenance.

An embodiment may provide another photovoltaic string location update system. With reference to FIG. 1, the photovoltaic string location update system includes a photovoltaic power station management system, an inverter, and an image collection terminal. The inverter is configured to send a logical location of a faulty photovoltaic string to the photovoltaic power station management system. The photovoltaic power station management system is configured to obtain a physical location of the faulty photovoltaic string based on the logical location of the faulty photovoltaic string. The image collection terminal is configured to receive the physical location of the faulty photovoltaic string from the photovoltaic power station management system. The physical location of the faulty photovoltaic string is used by the image collection terminal to perform photographing.

The logical location of the faulty photovoltaic string is sent to the photovoltaic power station management system. For this process, refer to step 701 in FIG. 7. The physical location of the faulty photovoltaic string is received from the photovoltaic power station management system. For this process, refer to step 703 in FIG. 7.

When the logical location of the faulty photovoltaic string is roughly determined, the physical location of the faulty photovoltaic string may be obtained, to prepare for photographing performed by the image collection terminal based on the physical location of the faulty photovoltaic string.

In a possible implementation, the photovoltaic power station management system is configured to obtain the physical location of the faulty photovoltaic string based on the logical location of the faulty photovoltaic string and a correspondence between a logical location of a photovoltaic string and a physical location.

When the logical location of the faulty photovoltaic string is roughly determined, the physical location of the faulty photovoltaic string may be obtained based on the correspondence between a logical location of a photovoltaic string and a physical location.

In a possible implementation, before obtaining the physical location of the faulty photovoltaic string based on the logical location of the faulty photovoltaic string and the first correspondence between a logical location of a photovoltaic string and a physical location, the photovoltaic power station management system is further configured to obtain, based on a physical map, a physical location of a first photovoltaic string corresponding to a first logical location in the physical map. The physical map is used to indicate a correspondence between a logical location of a photovoltaic string and a physical location of the photovoltaic string in the physical map. The photovoltaic string includes the first photovoltaic string. The photovoltaic power station management system is further configured to: when the physical location of the first photovoltaic string in the physical map is different from a first actual physical location of the first photovoltaic string, update the physical location of the photovoltaic string in the physical map to the first actual physical location, to obtain the updated physical map.

The physical location of the first photovoltaic string corresponding to the first logical location in the physical map is obtained based on the physical map. For this process, refer to step 301 in FIG. 3. When the physical location of the first photovoltaic string in the physical map is different from the first actual physical location of the first photovoltaic string, the physical location of the photovoltaic string in the physical map is updated to the first actual physical location, to obtain the updated physical map. For this process, refer to step 302 in FIG. 3.

The physical map may be updated when the actual physical location of the photovoltaic string is inconsistent with the physical location in the physical map. The following case is avoided: The actual physical location of the photovoltaic string is inconsistent with the physical location in the physical map, to prepare for subsequent operation and maintenance accurately performed on the photovoltaic module. In addition, when the logical location of the faulty photovoltaic string is subsequently roughly determined, the physical location of the faulty photovoltaic string is obtained based on the correspondence between a logical location of a photovoltaic string and a physical location.

In a possible implementation, the image collection terminal is further configured to send a first infrared image to the photovoltaic power station management system. The first infrared image includes a plurality of photovoltaic strings. The first photovoltaic string is one of the plurality of photovoltaic strings. An image feature corresponding to the first photovoltaic string in the first infrared image is different from an image feature corresponding to another photovoltaic string. The photovoltaic power station management system is further configured to obtain, based on the first infrared image, a physical location of a photovoltaic string whose image feature is different from the image feature corresponding to another photovoltaic string, to obtain the first actual physical location.

The first infrared image is sent to the photovoltaic power station management system. For this process, refer to step 501 in FIG. 5. The physical location of the photovoltaic string whose image feature is different from the image feature corresponding to another photovoltaic string is obtained based on the first infrared image, to obtain the first actual physical location. For this process, refer to step 502 in FIG. 5.

The actual physical location of the photovoltaic string may be obtained based on the infrared image to prepare for subsequent update of the physical map based on the actual physical location of the photovoltaic string.

In a possible implementation, the photovoltaic power station management system is configured to obtain the first actual physical location based on the relative physical location relationship between the plurality of photovoltaic strings and the first infrared image.

The actual physical location of the photovoltaic string may be obtained based on the infrared image, to prepare for subsequent update of the physical map.

In a possible implementation, the photovoltaic string location update system further includes the inverter. The inverter is configured to receive a control indication from the photovoltaic power station management system. The control indication is used to indicate the inverter to control detectable light intensity of the first photovoltaic string to be higher than or lower than detectable light intensity of another photovoltaic string. The first infrared image is an infrared image obtained after the image collection terminal photographs the plurality of photovoltaic strings when the detectable light intensity of the first photovoltaic string is higher than or lower than the detectable light intensity of another photovoltaic string.

The control indication is received from the photovoltaic power station management system. For this process, refer to related content of the control indication in FIG. 5.

The detectable light intensity of the first photovoltaic string may be controlled to be higher than or lower than the detectable light intensity of another photovoltaic string, so that the image collection terminal obtains the infrared image through photographing, to prepare for obtaining the actual physical location of the first photovoltaic string based on the physical map and the infrared image.

In a possible implementation, the photovoltaic power station management system is further configured to receive the first actual physical location sent from the first photovoltaic string.

The first photovoltaic string includes a plurality of photovoltaic modules connected in series. A communication module is disposed on each of the plurality of photovoltaic modules. The first actual physical location is sent by a communication module corresponding to the first photovoltaic module. The first photovoltaic module is one of the plurality of photovoltaic modules.

The actual physical location of the photovoltaic string may be obtained, to prepare for subsequent update of the physical map based on the actual physical location of the photovoltaic string.

In a possible implementation, the photovoltaic power station management system is further configured to receive a fault type of a faulty photovoltaic module from the image collection terminal. The faulty photovoltaic module is at least one photovoltaic module of the faulty photovoltaic string. The fault type of the faulty photovoltaic module is obtained by the image collection terminal based on a second infrared image including the faulty photovoltaic module. The second infrared image is obtained through photographing performed by the image collection terminal based on the physical location of the faulty photovoltaic string.

For the fault type, refer to related content of the fault type in FIG. 7.

The faulty photovoltaic module may be finely determined and the fault type of the faulty photovoltaic module may be obtained to prepare for subsequent operation and maintenance.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units. In other words, the units or the parts may be located in one location or may be distributed on a plurality of network units. Some or all of the units may be selected based on actual requirements to achieve the objectives of the embodiments.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments are all or partially generated. The computer may be a general-purpose computer, a special-purpose computer, a computer network, or another programmable apparatus. The computer instructions may be stored in a non-transitory computer-readable storage medium or may be transmitted by using the non-transitory computer-readable storage medium. The computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM); a random access memory (RAM); or a magnetic medium, for example, a floppy disk, a hard disk, a magnetic tape, or a magnetic disk; an optical medium, for example, a digital versatile disc (DVD); a semiconductor medium, for example, a solid-state disk (SSD); or the like.

What is claimed is:

1. A photovoltaic string location update method, comprising:
    with a processor of a photovoltaic power station management system
    obtaining a first logical location corresponding to a first photovoltaic string, said first logical location comprising an identifier of the first photovoltaic string;

using the identifier of the first photovoltaic string to obtain, by accessing a physical map comprising a data structure comprising a plurality of relative physical locations between photovoltaic strings, each of the relative physical locations relating one photovoltaic string selected from a plurality of photovoltaic strings including the first photovoltaic string to another photovoltaic string in the plurality of photovoltaic strings, a first physical location of the first photovoltaic string corresponding to the first logical location in the physical map, wherein the physical map is used to indicate a correspondence between logical locations of the plurality of photovoltaic strings and physical locations of the plurality of photovoltaic strings in the physical map; obtaining a first actual physical location of the first photovoltaic string by:

receiving a first infrared image from an image collection terminal, wherein the first infrared image comprises the plurality of photovoltaic strings, the first photovoltaic string is one of the plurality of photovoltaic strings, and an image feature corresponding to the first photovoltaic string in the first infrared image is different from an image feature corresponding to a second photovoltaic string; and obtaining, based on the first infrared image, a physical location of the first photovoltaic string whose image feature is different from the image feature corresponding to the second photovoltaic string, to obtain the first actual physical location of the first photovoltaic string; and when the physical location of the first photovoltaic string in the physical map is different from the first actual physical location of the first photovoltaic string, updating the physical location of the first photovoltaic string in the physical map to the first actual physical location, to obtain an updated physical map.

2. The photovoltaic string location update method according to claim 1, wherein, before receiving the first infrared image from the image collection terminal, the method further comprises:

sending a control indication to an inverter, wherein the control indication is used to direct the inverter to control detectable light intensity of the first photovoltaic string to be higher than or lower than detectable light intensity of the second photovoltaic string.

3. The photovoltaic string location update method according to claim 2, wherein the first infrared image is an infrared image obtained after the image collection terminal photographs the plurality of photovoltaic strings when the detectable light intensity of the first photovoltaic string is higher than or lower than the detectable light intensity of the second photovoltaic string.

4. The photovoltaic string location update method according to claim 1, further comprising:

receiving the first actual physical location sent from the first photovoltaic string.

5. The photovoltaic string location update method according to claim 3, wherein the method further comprises:

receiving a logical location of a faulty photovoltaic string from the inverter;

obtaining a physical location of the faulty photovoltaic string based on the updated physical map and the logical location of the faulty photovoltaic string; and sending the physical location of the faulty photovoltaic string to the image collection terminal, wherein the physical location of the faulty photovoltaic string is used by the image collection terminal to perform photography.

6. The photovoltaic string location update method according to claim 5, wherein the method further comprises:

receiving a fault type of a faulty photovoltaic module from the image collection terminal, wherein the faulty photovoltaic module is at least one photovoltaic module of the faulty photovoltaic string, the fault type of the faulty photovoltaic module is obtained by the image collection terminal based on a second infrared image comprising the faulty photovoltaic module, and the second infrared image is obtained through photography performed by the image collection terminal based on the physical location of the faulty photovoltaic string.

7. A photovoltaic string location update system, comprising a photovoltaic power station management system configured to, with a processor of the photovoltaic power station management system:

obtain a first logical location corresponding to a first photovoltaic string, said first logical location comprising an identifier of the first photovoltaic string;

use the identifier of the first photovoltaic string to obtain, by accessing a physical map comprising a data structure comprising a plurality of relative physical locations between photovoltaic strings, each of the relative physical locations relating one photovoltaic string selected from a plurality of photovoltaic strings including the first photovoltaic string to another photovoltaic string in the plurality of photovoltaic strings, a first physical location of the first photovoltaic string corresponding to the first logical location in the physical map, wherein the physical map is used to indicate a correspondence between logical locations of a plurality of photovoltaic strings and physical locations of a plurality of photovoltaic strings in the physical map;

wherein the photovoltaic string location update system further comprises an image collection terminal configured to send a first infrared image to the photovoltaic power station management system, wherein the first infrared image comprises the plurality of photovoltaic strings, the first photovoltaic string is one of the plurality of photovoltaic strings, and an image feature corresponding to the first photovoltaic string in the first infrared image is different from an image feature corresponding to a second photovoltaic string;

wherein the photovoltaic power station management system is further configured to obtain, based on the first infrared image, a physical location of the first photovoltaic string whose image feature is different from the image feature corresponding to the second photovoltaic string to obtain the first actual physical location; and when the physical location of the first photovoltaic string in the physical map is different from a first actual physical location of the first photovoltaic string, update the physical location of the first photovoltaic string in the physical map to the first actual physical location, to obtain an updated physical map.

8. The photovoltaic string location update system according to claim 7, further comprising:

an inverter configured to receive a control indication from the photovoltaic power station management system, wherein the control indication is used to direct the inverter to control detectable light intensity of the first photovoltaic string to be higher than or lower than detectable light intensity of the second photovoltaic string.

9. The photovoltaic string location update system according to claim 8, wherein the first infrared image is an infrared image obtained after the image collection terminal photographs the plurality of photovoltaic strings when the detectable light intensity of the first photovoltaic string is higher than or lower than the detectable light intensity of the second photovoltaic string.

10. The photovoltaic string location update system according to claim 7, wherein the photovoltaic power station management system is further configured to receive the first actual physical location sent from the first photovoltaic string.

11. The photovoltaic string location update system according to claim 10, wherein the inverter is further configured to send a logical location of a faulty photovoltaic string to the photovoltaic power station management system; the photovoltaic power station management system is further configured to obtain a physical location of the faulty photovoltaic string based on the updated physical map and the logical location of the faulty photovoltaic string; and sending the physical location of the faulty photovoltaic string to the image collection terminal, wherein the physical location of the faulty photovoltaic string is used by the image collection terminal to perform photography.

12. The photovoltaic string location update apparatus according to claim 11, wherein the image collection terminal is further configured to receive the physical location of the faulty photovoltaic string from the photovoltaic power station management system and the physical location of the faulty photovoltaic string is used by the image collection terminal to perform photography.

13. The photovoltaic string location update apparatus according to claim 11, wherein the photovoltaic power station management system is further configured to receive a fault type of a faulty photovoltaic module from the image collection terminal, the faulty photovoltaic module is at least one photovoltaic module of the faulty photovoltaic string, the fault type of the faulty photovoltaic module is obtained by the image collection terminal based on a second infrared image comprising the faulty photovoltaic module, and the second infrared image is photographed by the image collection terminal based on the physical location of the faulty photovoltaic string.

14. The photovoltaic string location update method according to claim 2, wherein the control indication is used to direct the inverter to control an electrical performance parameter of the first photovoltaic string that causes the detectable light intensity of the first photovoltaic string to be higher or lower than a threshold, and direct the inverter to control a second electrical performance parameter of the second photovoltaic string that causes the detectable light intensity of the second photovoltaic string to be lower or higher than a threshold.

15. The photovoltaic string location update method according to claim 6, wherein the fault type of the faulty photovoltaic module is obtained by the image collection terminal matching the second infrared image to one of a plurality of template images associated with a plurality of faults.

16. The photovoltaic string location update system according to claim 8, wherein the inverter is configured to, based on the control indication, direct the inverter to control an electrical performance parameter of the first photovoltaic string that causes the detectable light intensity of the first photovoltaic string to be higher or lower than a threshold, and direct the inverter to control a second electrical performance parameter of the second photovoltaic string that causes the detectable light intensity of the second photovoltaic string to be lower or higher than a threshold.

17. The photovoltaic string location update system according to claim 13, wherein the fault type of the faulty photovoltaic module is obtained by the image collection terminal matching the second infrared image to one of a plurality of template images associated with a plurality of faults.

18. The photovoltaic string location update method according to claim 1, wherein the physical map comprises a row and column arrangement comprising a plurality of rows and a plurality of columns, wherein the physical location of the first photovoltaic string corresponding to the first logical location in the physical map comprises a first row and column position corresponding to one row of the plurality of rows and one column of the plurality of columns;

wherein obtaining, based on the first infrared image, the actual physical location of the first photovoltaic string comprises identifying, from the first infrared image, an actual row and column position of the first photovoltaic string, wherein in said actual row and column position, at least one of: a row of the actual row and column position is different from the one row or a column of the actual row and column position is different from the one column.

19. The photovoltaic string update method according to claim 2, wherein the inverter comprises a plurality of maximum power point tracking (MPPT) solar controllers, each MPPT solar controller connected to one photovoltaic string in the plurality of photovoltaic strings; and wherein the control indication is used to direct the inverter to adjust the detectable light intensity of the first photovoltaic string via a first MPPT solar controller and adjust the detectable light intensity of the second photovoltaic string via a second MPPT solar controller, prior to receiving the first infrared image from the image collection terminal, wherein one of the first photovoltaic string and second photovoltaic string is increased in detectable light intensity and another of the first photovoltaic string and second photovoltaic string is decreased in detectable light intensity.

* * * * *